US008214381B2

(12) United States Patent  
Dettinger et al.

(10) Patent No.: US 8,214,381 B2  
(45) Date of Patent: Jul. 3, 2012

(54) EXPECTED FUTURE CONDITION SUPPORT IN AN ABSTRACT QUERY ENVIRONMENT

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 12/360,633

(22) Filed: Jan. 27, 2009

(65) Prior Publication Data

US 2010/0191767 A1    Jul. 29, 2010

(51) Int. Cl.  
*G06F 17/30*    (2006.01)

(52) U.S. Cl. ........................ 707/759; 707/779

(58) Field of Classification Search ............... None  
See application file for complete search history.

(56) References Cited

U.S. PATENT DOCUMENTS

2003/0212618 A1* 11/2003 Keyes et al. .......... 705/35  
2004/0254924 A1* 12/2004 Dettinger et al. ............ 707/4

* cited by examiner

*Primary Examiner* — Syed H Hasan  
(74) *Attorney, Agent, or Firm* — Patterson & Sheridan LLP

(57) ABSTRACT

Embodiments of the invention are generally related to data processing, and more specifically to retrieving data from a database. An abstract query may include query conditions and a first logical field comprising conditions for determining whether a second logical field will have a predefined value in the future. Upon execution, the abstract query may return results that satisfy the conditions for determining whether the second logical field will have the predefined value.

19 Claims, 4 Drawing Sheets

US 8,214,381 B2

EXPECTED FUTURE CONDITION SUPPORT IN AN ABSTRACT QUERY ENVIRONMENT

BACKGROUND OF THE INVENTION

1. Field of the Invention

The present invention is generally related to data processing, and more specifically to retrieving data from a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as SQL, that lets programmers and programs select, insert, update, find the location of data, and so forth.

SUMMARY OF THE INVENTION

The present invention is generally related to data processing, and more specifically to retrieving data from a database.

One embodiment of the invention provides a computer-implemented method for retrieving query results. The method generally comprises receiving an abstract query comprising at least one first logical field defined in a data abstraction model comprising a plurality of logical field definitions mapping the logical fields to physical fields of a database, wherein the first logical field comprises a plurality of conditions for determining whether a second logical field having a first value will have a predefined second value in the future, the plurality of conditions comprising a precursor condition indicating the predefined second value. The method further comprises executing the abstract query, wherein the execution comprises retrieving results that satisfy the plurality of conditions for determining whether the second logical field will have the predefined second value in the future.

Another embodiment of the invention provides a computer readable storage medium comprising a program product which, when executed by a processor, is configured to perform an operation for retrieving query results. The operation generally comprises receiving an abstract query comprising at least one first logical field defined in a data abstraction model comprising a plurality of logical field definitions mapping the logical fields to physical fields of a database, wherein the first logical field comprises a plurality of conditions for determining whether a second logical field having a first value will have a predefined second value in the future, the plurality of conditions comprising a precursor condition indicating the predefined second value. The operation further comprises executing the abstract query, wherein the execution comprises retrieving results that satisfy the plurality of conditions for determining whether the second logical field will have the predefined second value in the future.

Yet another embodiment of the invention provides a system comprising a memory comprising a program for executing queries and a processor. The processor, when executing the program is generally configured to receive an abstract query comprising at least one first logical field defined in a data abstraction model comprising a plurality of logical field definitions mapping the logical fields to physical fields of a database, wherein the first logical field comprises a plurality of conditions for determining whether a second logical field having a first value will have a predefined second value in the future, the plurality of conditions comprising a precursor condition indicating the predefined second value. The processor is further configured to execute the abstract query, wherein the execution comprises retrieving results that satisfy the plurality of conditions for determining whether the second logical field will have the predefined second value in the future.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
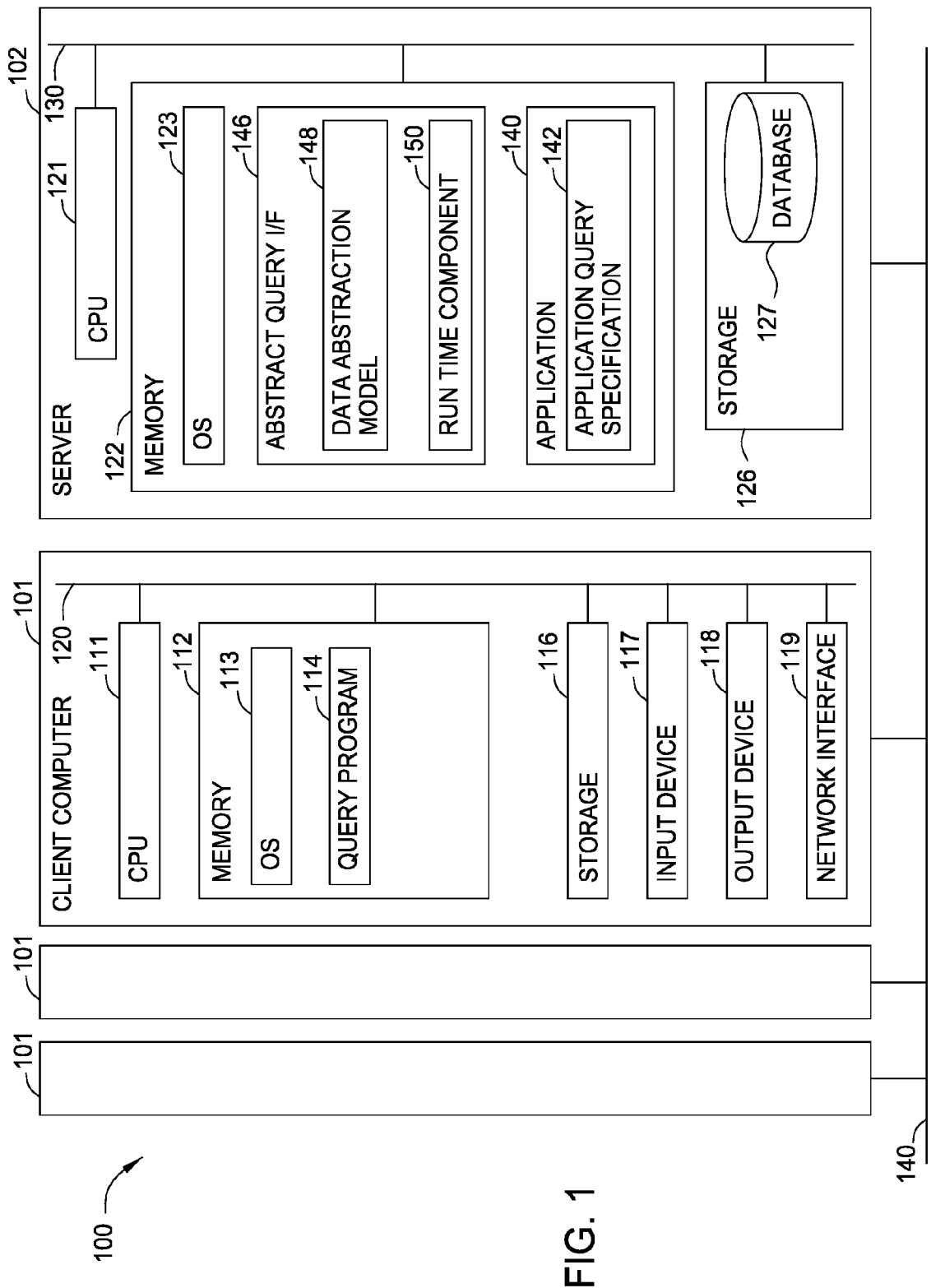
FIG. 1 illustrates an exemplary system according to an embodiment of the invention.

Embodiments of the present invention are generally related to data processing, and more specifically to retrieving data from a database. An abstract query may include query conditions and a first logical field comprising conditions for determining whether a second logical field will have a predefined value in the future. Upon execution, the abstract query may return results that satisfy the conditions for determining whether the second logical field will have the predefined value.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 depicts a block diagram of a networked system 100 in which embodiments of the invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device to give input to the client computer 101. For example, a keyboard, keypad, light-pen, touch-screen, trackball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a query program 114 which, when executed by CPU 111, provides support for issuing queries to server 102. In one embodiment, the query program 114 may include a web-based Graphical User Interface (GUI), which allows the user to display Hyper Text Markup Language (HTML) information. The GUI may be configured to allow a user to create a query, issue the query against a server 102, and display the results of the query. More generally, however, the query program may be any GUI-based program, for example, a browser, capable of rendering any information transferred between the client computer 101 and the server 102.

The server 102 may by physically arranged in a manner similar to the client computer 101. Accordingly, the server 102 is shown generally comprising at least one CPU 121, memory 122, and a storage device 126, coupled with one another by a bus 130. Memory 122 may be a random access memory sufficiently large to hold the necessary programming and data structures that are located on server 102. The server 102 may generally be under the control of an operating system 123 shown residing in memory 122. Examples of the operating system 123 include IBM OS/400®, UNIX, Microsoft Windows®, and the like. More generally, any operating system capable of supporting the functions described herein may be used.

The memory 122 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 121 in the server 102, the applications 140 and the abstract query interface 146 cause the computer system 100 to perform the steps necessary to execute steps or elements embodying the various aspects of the invention.

In one embodiment, the applications 140 (and more generally, any requesting entity, including the operating system 123) may be configured to issue queries against a database 127 (shown in storage 126). The database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data abstraction model 148 of the abstract query interface 146. Abstract queries are executed by a runtime component 150 which may transform the abstract queries into a form consistent with the physical representation of the data contained in the database 127. The application query specification 142 and the abstract query interface 146 are further described with reference to FIG. 2.

In one embodiment, elements of a query are specified by a user through a graphical user interface (GUI). The content of the GUIs may be generated by the application(s) 140. In a particular embodiment, the GUI content is hypertext markup language (HTML) content which may be rendered on the client computer systems 101 with query program 114. For example, the server 102 may respond to requests to access a database 127, which illustratively resides on the server 102. Incoming client requests for data from the database 127 may invoke an application 140. When executed by the processor 121, the application 140 may cause the server 102 to perform the steps or elements embodying the various aspects of the invention, including accessing database 127.

Relational View of Environment

Figure 2:
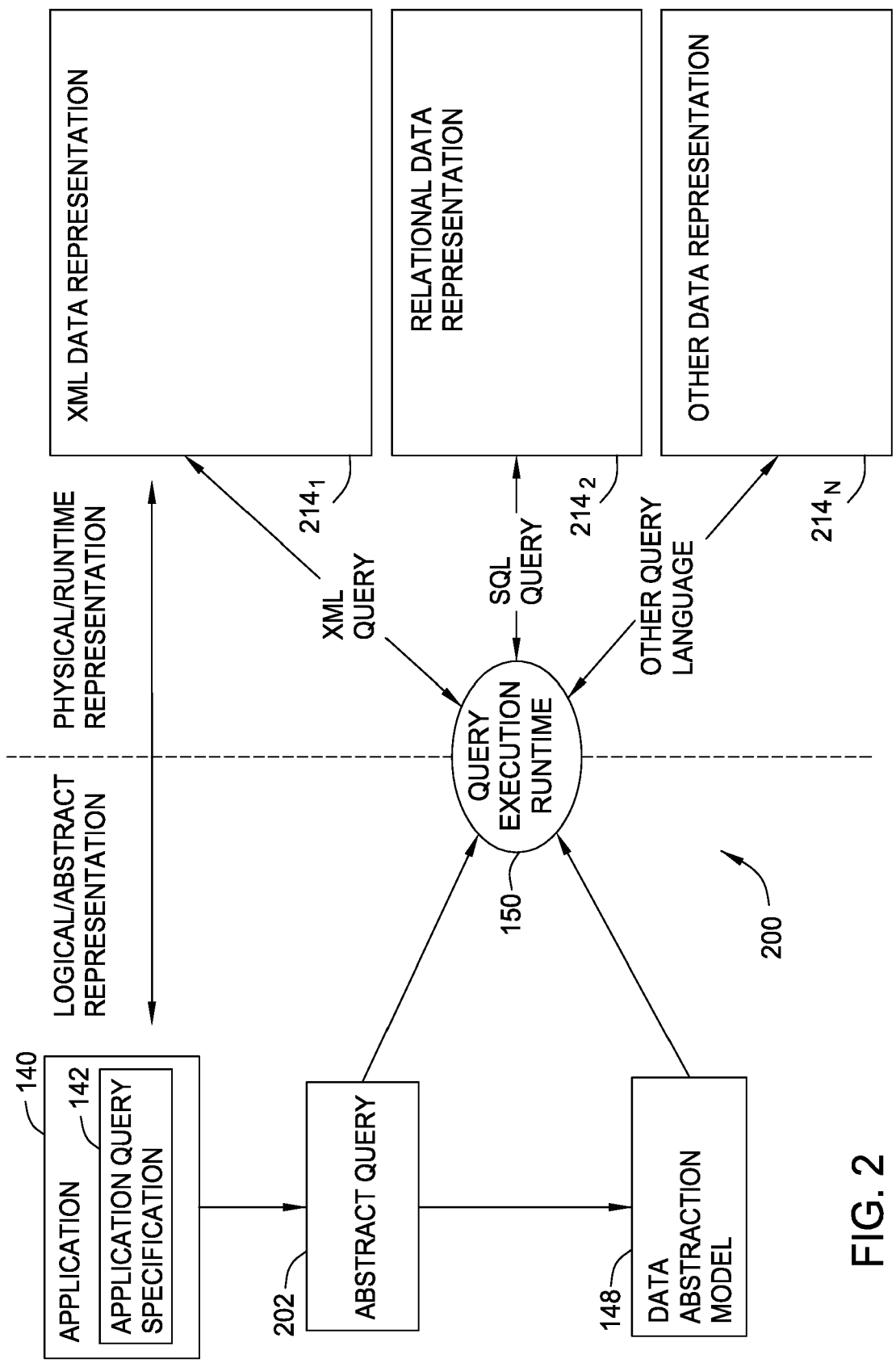
FIG. 2 illustrates a more relational view of software components used to create and execute database queries, according to an embodiment of the invention.

FIG. 2 illustrates an exemplary relational view 200 of components according to an embodiment of the invention. A requesting entity, for example, an application 140 may issue a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the database 127. As a result, abstract queries may be defined that are independent of the particular underlying data representation used. In one embodiment, the application query specification 142 may include both criteria used for data selection and an explicit specification of the fields to be returned based on the selection criteria.

The logical fields specified by the application query specification 142 and used to compose the abstract query 202 are defined by the data abstraction model 148. In general, the data abstraction model 148 may expose information as a set of logical fields that may be used within a query (e.g., the abstract query 202) issued by the application 140 to specify criteria for data selection and specify the form of result data returned from a query operation. The logical fields may be defined independently of the underlying data representation being used in the database 127, thereby allowing queries to be formed that are loosely coupled to the underlying data representation.

Figure 3:
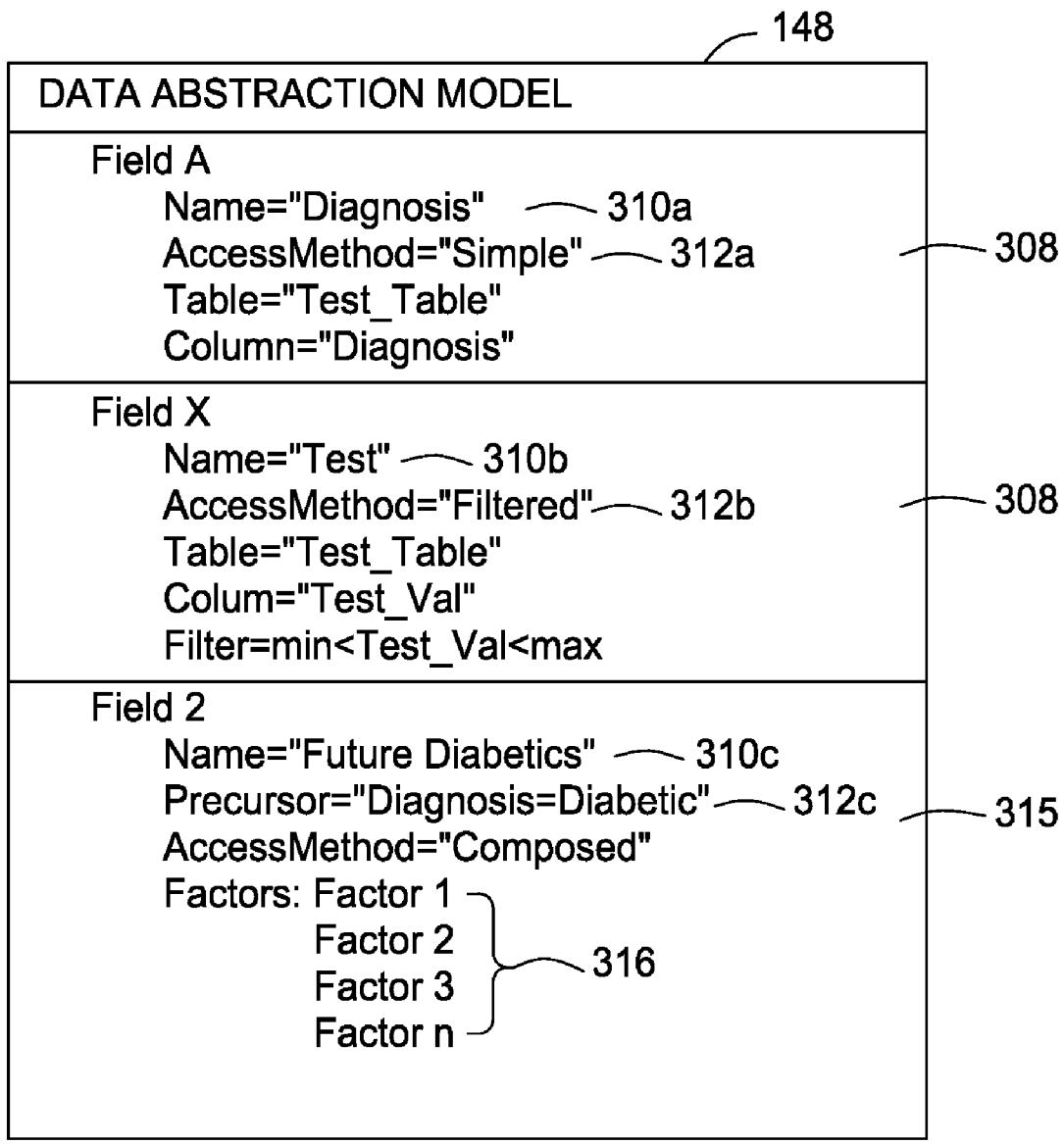
FIG. 3 illustrates an exemplary data abstraction model according to an embodiment of the invention.

FIG. 3 illustrates an exemplary data abstraction 148 model according to an embodiment of the invention. In general, data abstraction model 148 comprises a plurality of field specifications 308. A field specification may be provided for each logical field available for composition of an abstract query. Each field specification may comprise at least a logical field name 310 and an access method 312. For example, the field specification for Field A in FIG. 3 includes a logical field name 310a ('Diagnosis'), and an associated access method 312a ('simple').

The access methods may associate logical field names 310 to a particular physical data representation 214 (See FIG. 2) in a database 127. By way of illustration, two data representations are shown in FIG. 2, an XML data representation $214_1$, and a relational data representation $214_2$. However, the physical data representation $214_N$ indicates that any other data representation, known or unknown, is contemplated. In one embodiment, a single data abstraction module 148 may contain field specifications with associated access methods for two or more physical data representations 214. In an alternative embodiment, a separate data abstraction module 148 may be provided for each separate data representation 214.

Any number of access methods is contemplated depending upon the number of different types of logical fields to be supported. In one embodiment, access methods for simple fields, filtered fields and composed fields are provided. For example, field specifications for Field A exemplify a simple field access method 312a. Simple fields are mapped directly to a particular entity in the underlying physical data representation (e.g., a field mapped to a given database table and column). By way of illustration, the simple field access method 312a, shown in FIG. 3 maps the logical field name 310a ('Diagnosis') to a column named "Disease" in a table named "Test Table," as illustrated.

The field specification for Field X exemplifies a filtered field access method 312b. Filtered fields identify an associated physical entity and provide rules used to define a particular subset of items within the physical data representation. For example, the filtered field access method 312b may map the logical field name 310b to a physical entity in a column named "TestVal" in a table named "Test Table" and may define a filter for the test values. For example, in one embodiment, the filter may define a numerical range in which the test values may be deemed valid.

A composed field access method may also be provided to compute a logical field from one or more physical fields using an expression supplied as part of the access method definition. In this way, information which does not exist in the underlying data representation may be computed. For example, a sales tax field may be composed by multiplying a sales price field by a sales tax rate.

It is contemplated that the formats for any given data type (e.g., dates, decimal numbers, etc.) of the underlying data may vary. Accordingly, in one embodiment, the field specifications 308 may include a type attribute which reflects the format of the underlying data. However, in another embodiment, the data format of the field specifications 308 is different from the associated underlying physical data, in which case an access method is responsible for returning data in the proper format assumed by the requesting entity.

Thus, the access method must know what format of data is assumed (i.e., according to the logical field) as well as the actual format of the underlying physical data. The access method may then convert the underlying physical data into the format of the logical field. By way of example, the field specifications 308 of the data abstraction model 148 shown in FIG. 2 are representative of logical fields mapped to data represented in the relational data representation $214_2$. However, other instances of the data extraction model 148 map logical fields to other physical data representations, such as XML.

For purposes of illustration, the data abstraction model 148 is assumed herein to be associated with a hospital database including patient records. While querying of a hospital database is described herein, embodiments of the invention are not limited to querying of hospital databases. Embodiments of the invention may be used advantageously for querying any type of database containing any nature of information. The patient records in a hospital database may be accessed by health care professionals for diagnosing diseases, conducting research, and the like. For example, a researcher may want to identify diabetic patients while conducting research. Accordingly, the researcher may compose a query including Field A (Diagnosis). For example, the query may request results for patients where Diagnosis=Diabetic.

While the above described query is configured to return data for patients that have already been diagnosed as diabetic, in some cases, the researcher or a doctor may want to identify patients that are at risk of becoming diabetic in the future. By identifying such patients, preventive measures may be suggested to the patient. Such data may also be useful, for example, in determining particular medication that is used to treat the patient for another ailment. For example, potential future diabetic patients suffering from an ailment may be prescribed different medication as compared to non-diabetic patients.

In one embodiment of the invention, the data abstraction model 148 may include fields that determine an expected future condition of another field. For example, FIG. 3 illustrates a "Future Diabetics" field 310c for determining patients at risk of developing diabetes. As illustrated in FIG. 3, the future diabetics field 310c may include a precursor condition 315. The precursor condition 315 may identify the future condition that is to be determined. For example, in FIG. 3, the precursor condition for the future diabetics field 312c is shown as "Diagnosis=Diabetic". In other words, the precursor condition 315 indicates that the field 310c is configured to retrieve results for patients that are at risk of being diagnosed as diabetics in the future.

Any reasonable future condition or set of conditions may be included as the precursor condition 315. The precursor condition 315 may include any reasonable operator, for example, equal to, greater than, less than, greater than and equal to, less than and equal to, not equal to, and the like. Furthermore, the precursor condition may be configured to compare values in one or more desired fields in the data abstraction model 148 to any one of integers, floating point numbers, Boolean values, strings, and the like. For example, another exemplary precursor condition 315 may include the condition: DiabetesTestValue[[I]]>250.

In one embodiment of the invention, the access method for fields that determine an expected future condition may be a composed access method. The composed access method may be used to determine whether data from one or more other fields of the data abstraction model 148 indicate that a patient will develop diabetes in the future. For example, the future diabetics field 310c in FIG. 3 includes a composed access field 312c including a list of predictor conditions (or factors) 316 (shown as factors1-n) factors 316 may determine whether the expected future condition as defined by the precursor condition 315 is expected to occur. For example, determining whether a patient is at risk for developing diabetes may involve determining a history of diabetes in the patient's family, the patient's weight, smoking habits, and the like. Accordingly, the factors 316 may investigate fields relevant to the patient's family history, weight, smoking habits, and the like.

By providing a field that includes factors for determining a potential future value of another field, embodiments of the invention allow the normalization of the factors. For example, in the hospital organization, it may be desirable to have a uniform set of factors for determining whether a patient is at risk of developing diabetes in the future. The uniform list of factors may be captured in the future diabetics field 310c. Therefore, all users of system 100 may use the same factors to identify future diabetics by using the future diabetics field 310c in their respective queries.

For the purposes of this example, a patient is assumed to be at risk of becoming diabetic if the patient's father is diabetic, if the person's mother is diabetic, or if the person's weight is greater than 250 pounds. Therefore, the factors 316 may include:

a) Factor 1: Father's diagnosis=diabetic
    b) Factor 2: Mother's diagnosis=diabetic
    c) Factor 3: Weight>250

In one embodiment of the invention, if any one of the factors 1-3 above are true, a patient may be determined to be a future diabetic. Accordingly, the factors 1-3 may be combined using an OR operator. In other words, the factors 316 may be: (Father's diagnosis=diabetic) OR (Mother's diagnosis=diabetic) OR (Weight>250). In another embodiment, all three factors may have to be true for a patient to be determined as a future diabetic. Accordingly, the factors 316 may be: (Father's diagnosis=diabetic) AND (Mother's diagnosis=diabetic) AND (Weight>250).

While relating the factors using one of AND and OR operators is described above, alternative embodiments may use any other reasonable means for relating the conditions. For example, in one embodiment a combination of AND and OR operators may be used to relate the factors 316. In another embodiment, a case statement may be used to relate the factors 316 with one another. The case statement may test each of the factors 316 serially. If any one of the factors is true, the case statement may stop testing further factors and determine that the precursor condition is likely to occur in the future.

Included below is an exemplary abstract query (referred to hereinafter as query 1) which uses the future diabetics field 310c:

```
SELECT Patients, Future Diabetics
FROM Test_Table
WHERE Age<30
```

The query above retrieves data for patients less than the age of thirty that are at risk of becoming diabetic in the future from a table named Test_Table.

In one embodiment of the invention, while processing an abstract query, the runtime component 150 may be configured to combine conditions of the abstract query with precursor condition 315 and the factors 316 prior to transforming the abstract query into a form consistent with the physical representation of the data contained in a database. For example, the above abstract query may be combined as follows:

(Diagnosis ≠ Diabetes) AND [(Father's diagnosis = diabetic) AND (Mother's diagnosis = diabetic)] AND (Weight > 250)] AND (Age<30)

The query above which is formed by combining the conditions of the abstract query with the precursor condition 315 and the factors 315 is hereinafter referred to as a combined query. A first portion (Diagnosis≠Diabetes) of the combined query above corresponds to the precursor condition. As can be seen above, the precursor condition has been negated. In other words, the precursor condition 315 which is shown as (Diagnosis=Diabetes) in FIG. 3 has been changed to (Diagnosis≠Diabetes). The precursor condition may be negated so that the query results do not include patients that are already diagnosed as diabetic.

For example, the database may include patients that are already determined to be diabetic that meet the conditions 316. Because only results for patients that are not currently diabetic, but likely to become diabetic in the future is desired, a negated precursor condition is included to remove patients that are already diabetic from the query results.

Negating the precursor condition may generally involve changing one or more comparison operators in the precursor condition. For example, negation of the precursor condition 315 in FIG. 3 involves changing an 'equal to' comparison operator to a 'not equal to' operator. In other embodiments, negation may include, for example, changing a 'greater than an equal to' operator to a 'lesser than' operator, and vice versa, changing a 'greater than' operator to a 'lesser than and equal to' operator, and vice versa, and the like.

In one embodiment, the precursor condition 315 may be already negated in the future diabetics field 310c. In other words, the precursor condition may be (Diagnosis≠Diabetes) in one embodiment. Therefore, in embodiments where the precursor condition is already negated in a field of the data abstraction model, the runtime component 150 may simply include the precursor condition without negation in the combined query.

A second portion of the combined query above may include the factors 316 that are related in a predefined manner, as described above. For example, the factors [(Father's diagnosis=diabetic) AND (Mother's diagnosis=diabetic)] are shown in the combined query above. A third portion of the combined query (Age<30) may include conditions defined in the received abstract query. In the combined query above, the first, second, and third portions of the combined query are combined with an AND operator. In alternative embodiments, any combination of AND and OR operators may be used to combine the first, second, and third portions.

In one embodiment of the invention, it may be determined that a future condition defined by the precursor condition will occur if a predefined number of factors of a plurality of factors 316 are determined to be present. A factor may be present if a condition defined by the factor is determined to be true. For example, the future diabetics field 310c may include the three factors provided above. In one embodiment of the invention, a patient may be determined to be a future diabetic of a predetermined number (for example, two) of factors of the three factors are present.

In one embodiment of the invention, a logical field definition such as the logical field 310c may include a call to a function configured to analyze the one or more factors 316. The runtime component 150 may be configured to invoke the function during execution of an abstract query comprising the logical field. In one embodiment, the function may be configured to determine a number of factors that are present. For example, the run time component may form the following combined query in response to receiving query 1 above:

(Diagnosis ≠ Diabetes) AND [FactorCount(Father's diagnosis, Mother's diagnosis, Weight)≧2] AND (Age<30)

As illustrated above, the combined query includes a call to a function FactorCount( ). The function FactorCount( ) may be configured to determine a number of factors of a plurality of factors 316 that are present. As can be seen in the combined query above, the function FactorCount( ) receives as an input, values associated with the plurality of factors 316. Exemplary pseudocode for the function FactorCount( ) is provided below:

```
count=0
If Father's diagnosis = diabetic then count = count+1
If Mother's diagnosis = diabetic then count = count+1
If Weight > 250 then count = count+1
Return count
```

The function FactorCount( ) returns the value of count which may be compared to a predefined number (for example, two, in the exemplary combined query above). If the count is greater than or equal to the predefined number, it may be possible that the patient is a future diabetic. In other embodiments, any reasonable comparison operator including greater than, equal to, less than, less than or equal to, or the like may be used to compare the count value returned from the function FactorCount( ) to the predefined number.

In one embodiment, each factor 316 may have a predefined weight value. Therefore, in some embodiments, the weight values of present factors may determine whether a patient is a future diabetic or not. Exemplary weight values for the three exemplary factors described above are provided below:

a) Factor 1: Father's diagnosis=diabetic; Weight=5
b) Factor 2: Mother's diagnosis=diabetic; Weight=3
c) Factor 3: Weight>250; Weight=1

In one embodiment, a patient may be determined to be a future diabetic if the sum of weights of the present factors is greater than or equal to a predefined value. For example, a patient may be determined to be a future diabetic if the sum of the weights of factors present with respect to the patient is greater than or equal to 5.

In one embodiment of the invention, the run time component 150 may be configured to call a function that is configured to determine the sum of weights of present factors while executing a combined query. An exemplary combined query including a call to a function TotalWeight( ) configured to determine the total weight of the present factors is provided below:

```
(Diagnosis ≠ Diabetes) AND [TotalWeight(Father's diagnosis,
    Mother's diagnosis, Weight)≧5] AND (Age<30)
```

Exemplary pseudocode for the function TotalWeight( ) is provided below:

```
totweight=0
If Father's diagnosis = diabetic then totweight = totweight+Father's
    diagnosis weight
If Mother's diagnosis = diabetic then totweight = totweight +Mother's
    diagnosis weight
If Weight > 250 then totweight = totweight +Weight's weight
Return totweight
```

In the exemplary pseudocode above the Father's diagnosis weight, Mother's diagnosis weight, and Weight's weight correspond to the exemplary weight values for the three exemplary factors described above.

In alternative embodiments, an average weight of present factors may be compared to a predefined value instead of calculating a total weight. In some embodiments of the invention, the runtime component 150 may call a plurality of functions, for example, the FactorCount( ) and Total Weight( ) functions. Accordingly, in some embodiments, whether a patient is determined to be a future diabetic or not may depend on a total number of factors present and the weight of the factors.

After forming the combined query, the runtime component 150 may transform the combined query into a form consistent with the physical representation of the data contained in the database 127, and retrieve results for the query. In one embodiment of the invention, the runtime component 150 may be configured to order the retrieved results based on a predetermined criteria. For example, in one embodiment, the runtime component 150 may be configured to order the results based on decreasing total weight (or factor count) values.

Figure 4:
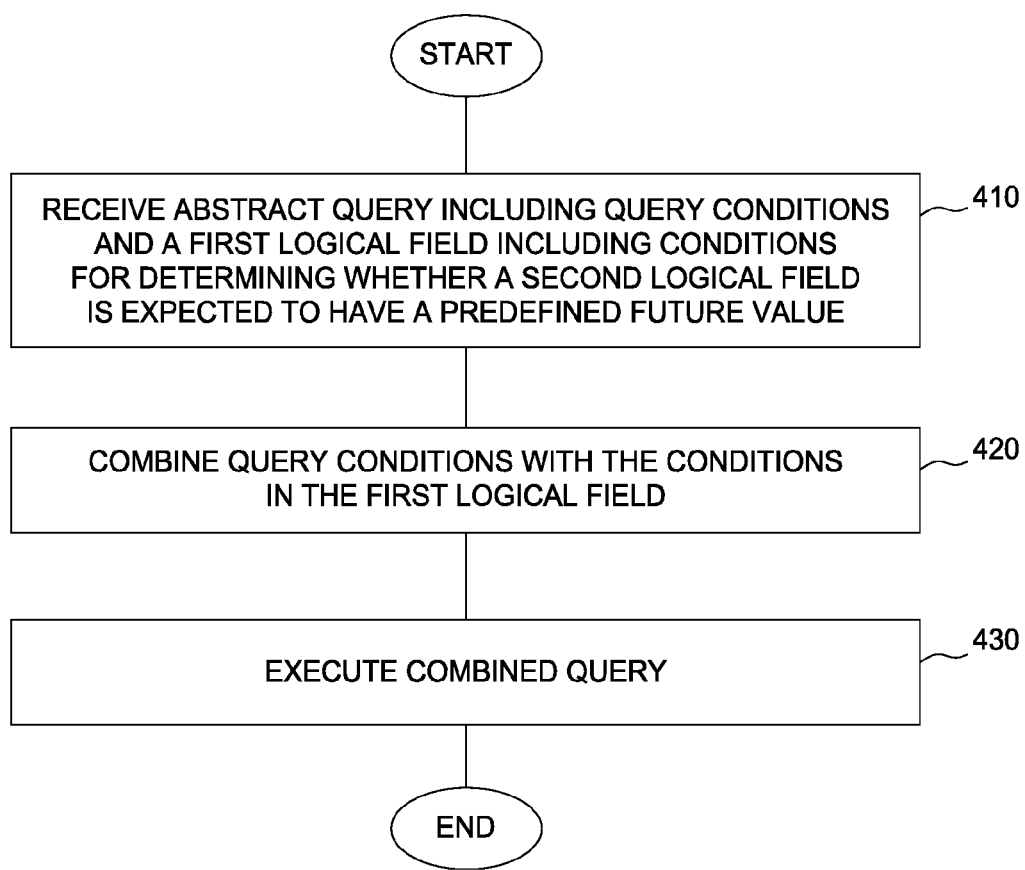
FIG. 4 is a flow diagram of exemplary operations performed by a runtime component according to an embodiment of the invention.

FIG. 4 illustrates a flow diagram of exemplary operations performed by the runtime component 150, according to an embodiment of the invention. The operations may begin in step 410 by receiving an abstract query including query conditions and a first logical field including conditions for determining whether a second field is expected to have a predefined value in the future. The conditions may include, for example, the precursor condition 315 and the factors 316. In step 420, the runtime component may combine the conditions of the first logical field with the query conditions to form a combined query, as described above. In step 430, the runtime component may execute the combined query to retrieve results for the combined query.

By providing a logical field capable of determining whether a second logical field will have a predefined value in the future, embodiments of the invention facilitate retrieval of query results based on expected future values of the second logical field.

While the foregoing is directed to embodiments of the present invention, other and further embodiments of the invention may be devised without departing from the basic scope thereof, and the scope thereof is determined by the claims that follow.

What is claimed is:

1. A computer-implemented method for retrieving query results, comprising:

providing a data abstraction model comprising a plurality of field specifications mapping at least one logical field to physical fields of a database, wherein each field specification comprises at least a logical field name and an access method, and wherein the access method associates logical field names to a particular physical data representation in the database;

receiving an abstract query specifying a name of at least a first logical field defined in the data abstraction model, wherein the first logical field comprises a plurality of conditions for determining whether a second logical field having a first value will have a predefined second value in the future, wherein at least one condition is expressed in terms of at least one logical field, the plurality of conditions comprising a precursor condition indicating the predefined second value and at least one predictor condition, wherein the abstract query does not specify: (i) the first value; (ii) the second value; and (iii) any of the plurality of conditions; and executing the abstract query by operation of one or more computer processors, comprising:

identifying the logical field referenced by the abstract query through the data abstraction model to retrieve the precursor condition and the at least one predictor condition;

negating the precursor condition;

identifying at least one logical field referenced by the at least one predictor condition through the data abstraction model;

identifying at least one physical field referenced by the identified at least one logical field through the data abstraction model;

generating a concrete query based on the negated precursor condition, the at least one predictor condition, and the at least one physical field; and executing the concrete query to retrieve query results responsive to the abstract query.

2. The method of claim 1, wherein the at least one predictor condition is used for determining whether the second logical field will have the predefined second value in the future.

3. The method of claim 2, wherein the first logical field comprises a plurality of predictor conditions, and wherein execution of the abstract query comprises determining whether a predefined number of predictor conditions are satisfied, the satisfaction of the predefined number of predictor conditions indicating that the second logical field will have the predefined second value in the future.

4. The method of claim 2, wherein the first logical field comprises a plurality of predictor conditions, each predictor condition having an associated weight value, and wherein execution of the abstract query comprises determining whether the second logical field will have the predefined second value in the future based on the weights of satisfied predictor conditions.

5. The method of claim 1, wherein the abstract query further comprises one or more query conditions comprising at least one third logical field.

6. The method of claim 1, wherein the execution comprises executing a function configured to analyze the plurality of conditions for determining whether the second logical field will have the predefined second value in the future, wherein the function returns a value indicating whether the second logical field will have the predefined second value in the future.

7. The method of claim 1, wherein a first one of: (i) the first value and (ii) the second value is defined in the first logical field, and wherein a second one of: (i) the first value and (ii)

the second value is not defined in the first logical field, and is dynamically generated by negating the first one.

8. A computer readable storage medium comprising a program product which, when executed by a processor, is configured to perform an operation for retrieving query results, comprising:

providing a data abstraction model comprising a plurality of field specifications mapping at least one logical field to physical fields of a database, wherein each field specification comprises at least a logical field name and an access method, and wherein the access method associates logical field names to a particular physical data representation in the database;

receiving an abstract query specifying a name of at least a first logical field defined in the data abstraction model, wherein the first logical field comprises a plurality of conditions for determining whether a second logical field having a first value will have a predefined second value in the future, wherein at least one condition is expressed in terms of at least one logical field, the plurality of conditions comprising a precursor condition indicating the predefined second value and at least one predictor condition, wherein the abstract query does not specify: (i) the first value; (ii) the second value; and (iii) any of the plurality of conditions; and executing the abstract query, comprising:
identifying the logical field referenced by the abstract query through the data abstraction model to retrieve the precursor condition and the at least one predictor condition;

negating the precursor condition;

identifying at least one logical field referenced by the at least one predictor condition through the data abstraction model;

identifying at least one physical field referenced by the identified at least one logical field through the data abstraction model;

generating a concrete query based on the negated precursor condition, the at least one predictor condition, and the at least one physical field; and executing the concrete query to retrieve query results responsive to the abstract query.

9. The computer readable storage medium of claim 8, wherein the at least one predictor condition is used for determining whether the second logical field will have the predefined second value in the future.

10. The computer readable storage medium of claim 9, wherein the first logical field comprises a plurality of predictor conditions, and wherein execution of the abstract query comprises determining whether a predefined number of predictor conditions are satisfied, the satisfaction of the predefined number of predictor conditions indicating that the second logical field will have the predefined second value in the future.

11. The computer readable storage medium of claim 9, wherein the first logical field comprises a plurality of predictor conditions, each predictor condition having an associated weight value, and wherein execution of the abstract query comprises determining whether the second logical field will have the predefined second value in the future based on the weights of satisfied predictor conditions.

12. The computer readable storage medium of claim 8, wherein the abstract query further comprises one or more query conditions comprising at least one third logical field.

13. The computer readable storage medium of claim 8, wherein the execution comprises executing a function configured to analyze the plurality of conditions for determining whether the second logical field will have the predefined second value in the future, wherein the function returns a value indicating whether the second logical field will have the predefined second value in the future.

14. A system, comprising:
a memory comprising a program for executing queries; and
a processor which, when executing the program is configured to:

provide a data abstraction model comprising a plurality of field specifications mapping at least one logical field to physical fields of a database, wherein each field specification comprises at least a logical field name and an access method, and wherein the access method associates logical field names to a particular physical data representation in the database;

receive an abstract query specifying a name of at least a first logical field defined in the data abstraction model, wherein the first logical field comprises a plurality of conditions for determining whether a second logical field having a first value will have a predefined second value in the future, wherein at least one condition is expressed in terms of at least one logical field, the plurality of conditions comprising a precursor condition indicating the predefined second value and at least one predictor condition, wherein the abstract query does not specify: (i) the first value; (ii) the second value; and (iii) any of the plurality of conditions; and execute the abstract query, comprising:
identifying the logical field referenced by the abstract query through the data abstraction model to retrieve the precursor condition and the at least one predictor condition;

negating the precursor condition;

identifying at least one logical field referenced by the at least one predictor condition through the data abstraction model;

identifying at least one physical field referenced by the identified at least one logical field through the data abstraction model;

generating a concrete query based on the negated precursor condition, the at least one predictor condition, and the at least one physical field; and executing the concrete query to retrieve query results responsive to the abstract query.

15. The system of claim 14, wherein the at least one predictor condition is used for determining whether the second logical field will have the predefined second value in the future.

16. The system of claim 15, wherein the first logical field comprises a plurality of predictor conditions, and wherein execution of the abstract query comprises determining whether a predefined number of predictor conditions are satisfied, the satisfaction of the predefined number of predictor conditions indicating that the second logical field will have the predefined second value in the future.

17. The system of claim 15, wherein the first logical field comprises a plurality of predictor conditions, each predictor condition having an associated weight value, and wherein the processor is configured to execute the query by determining whether the second logical field will have the predefined second value in the future based on the weights of satisfied predictor conditions.

18. The system of claim 14, wherein the abstract query further comprises one or more query conditions comprising at least one third logical field.

19. The system of claim 14, wherein the processor is configured to execute the program by executing a function configured to analyze the plurality of conditions for determining whether the second logical field will have the predefined second value in the future, wherein the function returns a value indicating whether the second logical field will have the predefined second value in the future.

* * * * *